(12) United States Patent
Wafzig et al.

(10) Patent No.: US 6,689,013 B1
(45) Date of Patent: Feb. 10, 2004

(54) CONTINUOUSLY VARIABLE FRICTION GEAR TRANSMISSION

(75) Inventors: Jürgen Wafzig, Eriskirch (DE); Bernhard Sich, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/168,177

(22) PCT Filed: Nov. 28, 2000

(86) PCT No.: PCT/EP00/11863

§ 371 (c)(1),
(2), (4) Date: Jun. 18, 2002

(87) PCT Pub. No.: WO01/46604

PCT Pub. Date: Jun. 28, 2001

(30) Foreign Application Priority Data

Dec. 21, 1999 (DE) .................................. 199 61 692

(51) Int. Cl.[7] .............................................. F16H 15/38
(52) U.S. Cl. ............................................ 476/40; 476/67
(58) Field of Search ................. 476/40, 67, 1, 476/39

(56) References Cited

U.S. PATENT DOCUMENTS

| | | | |
|---|---|---|---|
| 4,934,206 A | 6/1990 | Nakano | 74/200 |
| 5,033,322 A | 7/1991 | Nakano | 74/200 |
| 5,902,208 A | 5/1999 | Nakano | 476/42 |
| 5,971,885 A * | 10/1999 | Greenwood et al. | 476/8 |
| 6,244,985 B1 | 6/2001 | Wafzig et al. | 476/42 |
| 6,375,594 B1 * | 4/2002 | Wafzig | 476/40 |
| 2002/0128114 A1 * | 9/2002 | Ervin | 476/40 |
| 2002/0155918 A1 * | 10/2002 | Misada | 476/42 |

FOREIGN PATENT DOCUMENTS

| | | | |
|---|---|---|---|
| DE | 2 236 589 | 2/1973 | ......... F16H/15/38 |
| DE | 198 19 385 A1 | 11/1997 | ......... F16H/57/04 |
| DE | 197 21 674 A1 | 11/1999 | ......... F16H/37/02 |
| DE | 198 26 591 A1 | 12/1999 | ......... F16H/15/40 |
| EP | 0 425 914 A2 | 5/1991 | ......... F16H/15/38 |
| GB | 1 395 319 | 5/1975 | ......... F16H/15/38 |
| JP | 06159465 | 6/1994 | ......... F16H/15/38 |
| JP | 06280955 | 10/1994 | ......... F16H/15/38 |
| JP | 07158712 A | 6/1995 | ......... F16H/15/38 |
| WO | 99/05433 | 2/1999 | ......... F16H/15/38 |
| WO | 99/05434 | 2/1999 | ......... F16H/15/38 |

* cited by examiner

*Primary Examiner*—David Fenstermacher
(74) *Attorney, Agent, or Firm*—Davis & Bujold PLLC

(57) ABSTRACT

The continuously variable friction gear transmission has one housing and one variator which is inserted therein and which is mounted on a power frame. In order to provide this variator in the form of an operationally capable autarchic unit, the support pistons for the trunnions are integrated in the power frame.

3 Claims, 2 Drawing Sheets

CONTINUOUSLY VARIABLE FRICTION GEAR TRANSMISSION

FIELD OF THE INVENTION

This invention relates to a continously variable friction gear transmission.

BACKGROUND OF THE INVENTION

One friction gear transmission has been described, for example, in the Applicant's WO 99/05433. It has input and output discs, which are placed coaxially to a common shaft, are arranged in pairs and have toroid-shaped inner faces, the same as friction gears situated between the pairs of input and output discs. Said friction gears are in frictional contact both with the input discs and the output discs and transmit the torque that is transmitted to them by the input disc to the output disc by means of a frictional engagement contact, the rotational speed of the friction gears being higher the greater the distance is between their contact point with the input disc and the axis of rotation. The rotational speed of the output disc is to the contrary, higher the nearer the contact point between friction gear and output disc lies on the axis of rotation. By swinging the friction gears, accordingly, it is possible to continuously and to arbitrarily adjust the rotational speed of the output disc. To this end, the axes of rotation of the friction gears are supported on a carrier controllable via a swinging device. Both input discs of both transmission units are here non-rotatably connected with a torque shaft while both output discs of both transmission units, which in the transmission are disposed with mirror symmetry to each other, are situated upon a common bushing rotatably supported upon the torque shaft. The torque shaft is traversed by an input shaft which is connected with a starting element of a motor vehicle, such as a torque converter or a wet-running starting clutch of the prime mover of the vehicle.

One other friction gear transmission was disclosed in WO 99/05434. In this friction gear transmission, a power frame is loosely secured to the transmission housing, said power frame has an upper frame bracket, a lower frame bracket, transverse yokes for fastening trunnions and carriers for the friction gears, the same as a cup-shaped bearing element that connects the upper frame bracket with the lower frame bracket. Said bearing element is situated between the two hollow spaces where both transmission units are located and is axially traversed by the torque shaft. The frame brackets can be screwed or welded with the power frame which power frame carries the essential elements of the variator and is utilizable as a pre-assembled unit in the transmission housing.

After fitting the variator parts outside the transmission housing and inserting the pre-assembled variator in the transmission housing, other parts such as a starting element, a reversing set and a hydraulic control are to be installed in the transmission housing. Only after assembly of all parts is it possible to test the operating capacity of the variator. In case of defective behavior of the variator, prior to actual service diagnosis, the disassembly of the additional parts like the starting element, etc., is required before the pre-assembled variator can be removed. But such assembly and disassembly works are associated with great expenditure of time and costs.

The problem on which this invention is based is to develop a variator not only as pre-assembled construction unit but as on autarchic construction unit capable of operation prior to installation in the transmission housing.

SUMMARY OF THE INVENTION

According to the invention, it is provided that the supporting pistons for the trunnions are integrated in the power frame so that, prior to installation in the transmission housing, the variator is developed as an operationally capable autarchic unit which can be fully tested before installation and only after successful inspection is fitted in the transmission housing as a construction part.

The power frame makes a pre-assembly outside the transmission housing possible so that the supporting pistons for the trunnions can be easily integrated in them. At the same time, the feedback rod for the control valve, designed as a square slide, can constitute the interface; also possible is an integration in the power frame of said square slide, including or excluding the stepping motor.

In an advantageous embodiment, the discs of the transmission units can be lubricated or cooled via the upper and/or lower posts, the power frame absorbing the lubricant pressure, through one or more ducts situated in it, and relaying it via associated ducts to the critical parts of the discs.

In another preferred embodiment, a suppressing labyrinth for ventilation of the transmission housing is provided in the power frame, since a retention of the highly volatile friction fluid there by is ensured.

One other advantage is to be seen in that the integration of the complete output constants, including the gear wheel of the side shaft and the full support of both gear wheels in the power frame, make a simple assembly and an advantageous tolerance draft possible for both friction gears, such as needed for the extremely quickly rotating friction gears.

BRIEF DESCRIPTION OF THE DRAWINGS

The invention will now be described, by way of example, with reference to the accompanying drawings that show the essential parts of an inventively developed friction gear transmission in which.

DETAILED DESCRIPTION OF THE INVENTION

Figure 1:
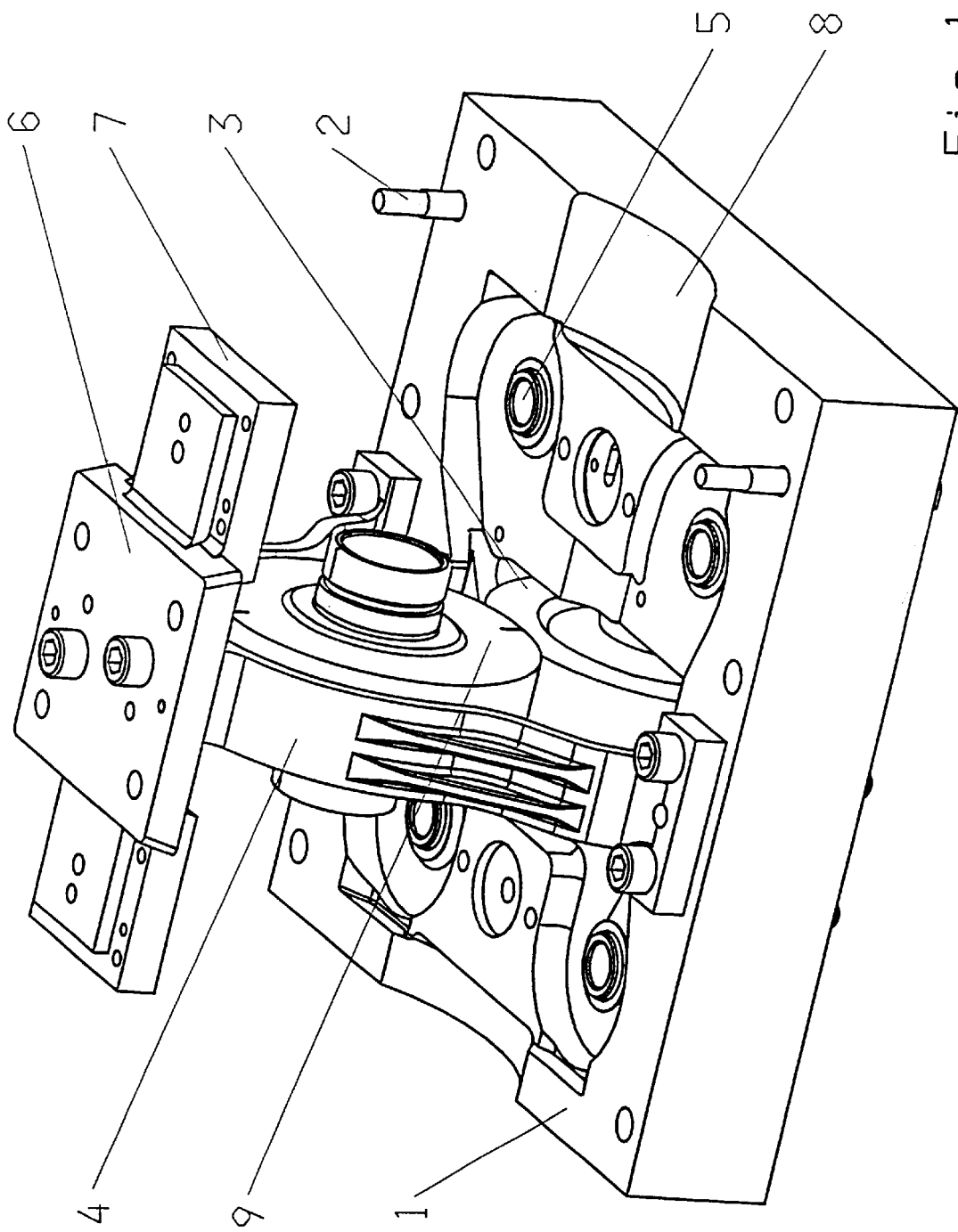
FIG. 1 is a perspective top view on one part of a friction gear transmission.
Figure 2:
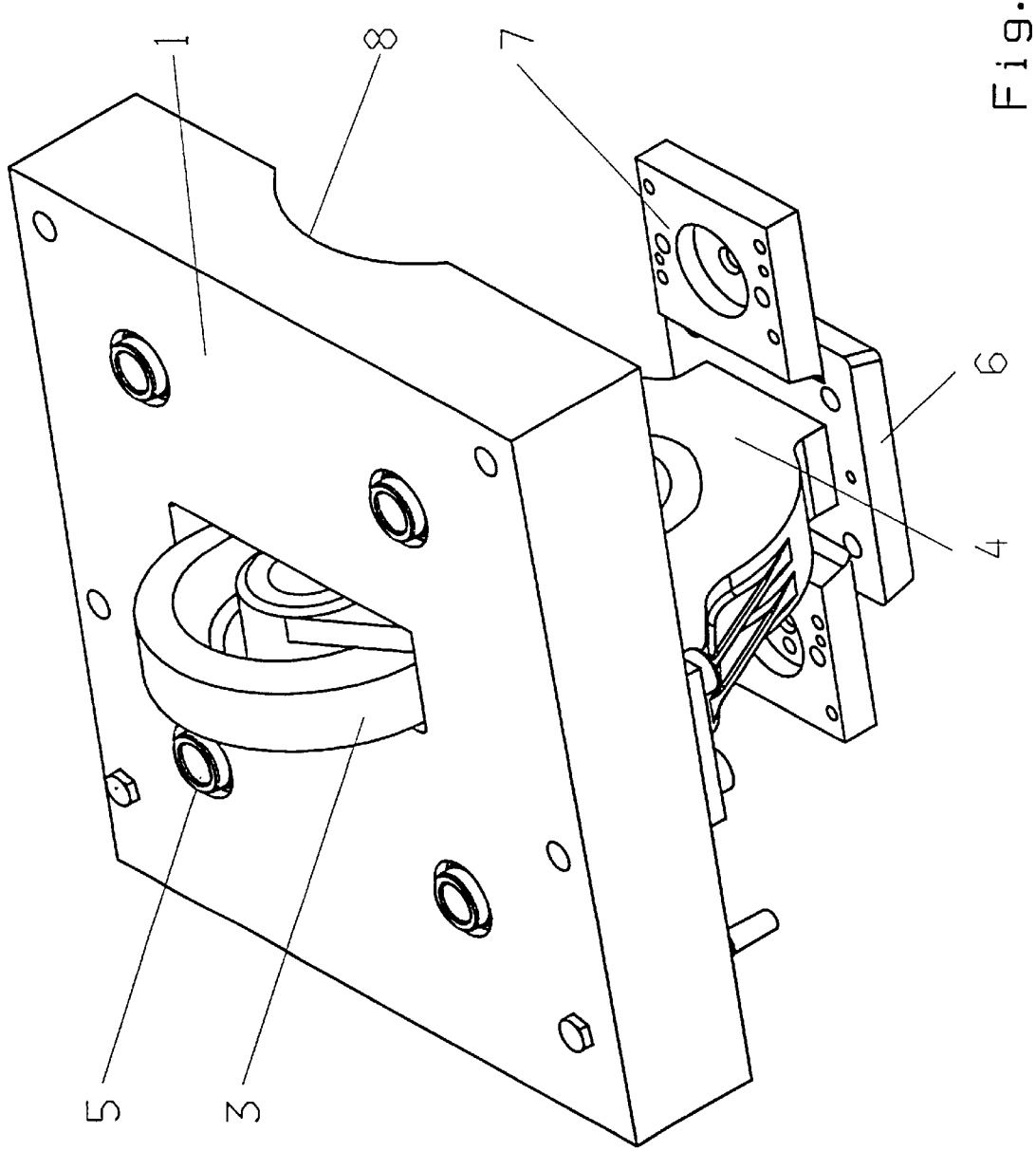
FIG. 2 is a perspective bottom view of said friction gear transmission.

Since the total construction of friction gear transmissions has, for example, been described in all details in the two older patent applications of the Applicant and the expert is familiar with it, only the essential parts have been shown in the drawings.

With 1 is designated a piston unit, with 2 a tight-fit screw, with 3 the so-called gear driven, with 4 a bearing plate, with 5 a guide for the trunnions, with 6 and 7 parts of the upper frame bracket, with 8 a recess for one of the input discs and with 9 the so-called gear drive.

As can be seen, the supporting pistons for the trunnions are integrated in the power frame which makes the pre-assembly possible prior to insertion in the transmission housing. Thereby the feedback rod for the control valve, which is preferably designed as a square slide, can constitute the interface, but it is also possible to integrate said control valve in the power frame including or excluding the stepped motor.

The discs for both transmission units can be lubricated or cooled, via the upper and lower posts, the power frame centrally absorbing the lubrication pressure in a duct (not shown) and relaying it, via ducts connected therewith, to the critical parts of the discs.

It is further possible to integrate a suppressing labyrinth, into the power frame, for ventilation of the transmission housing so that a retention of the highly volatile traction fluid is ensured.

With the inventive integration of support, lubrication and cooling an optionally also of the control valve designed as a square slide, an operationally capable construction unit is provided which can be fully tested prior to installation in the transmission housing and be inserted in the transmission housing only after successful inspection.

What is claimed is:

1. A continuously variable friction gear transmission comprising:

a housing;

a input shaft;

a torque shaft situated coaxially with the input shift;

a variator comprising two input discs with toroid-shaped inner faces disposed coaxially to said input shaft, two output discs with toroid-shaped inner faces disposed coaxially to said input shaft whereby each input disc with each output disc form one pair and both output discs are disposed side by side in mirror symmetry with respect to each other, the same as several friction gears tiltably situated between the inner faces of said pairs of input discs and output discs for transmitting a torque from the input disc to the appertaining output disc;

a carrier (trunnion) for each friction gear;

a tilting device with a supporting piston for each carrier;

transverse yokes for connecting said carriers;

a power frame with one upper frame bracket (6.7) one lower frame bracket (1) and one supporting element (4) which connects said upper frame bracket with said lower frame bracket; and posts for connecting said transverse yokes with the upper and lower frame brackets (6. 7);

wherein said supporting pistons for said carriers (trunnions) are integrated in said power frame so that said variator forms, prior to installation in said transmission housing, an autarchic unit capable of operation.

2. The continuously variable friction gear transmission according to claim 1, wherein a stepped motor, for control of said tilting device, is integrated in said power frame.

3. The continuously variable friction gear transmission according to claim 1, wherein said power frame is provided with ducts for absorption and relay of the lubricant and cooling fluid for said discs to upper and lower posts.

* * * * *